United States Patent
Kempers et al.

(10) Patent No.: US 11,428,164 B2
(45) Date of Patent: Aug. 30, 2022

(54) GAS TURBINE ENGINE WITH SCALABLE PUMPING SYSTEM

(71) Applicant: Rolls-Royce Corporation, Indianapolis, IN (US)

(72) Inventors: Adam L. Kempers, Indianapolis, IN (US); John R. Gebhard, Fishers, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 668 days.

(21) Appl. No.: 16/281,789

(22) Filed: Feb. 21, 2019

(65) Prior Publication Data
US 2020/0271055 A1    Aug. 27, 2020

(51) Int. Cl.
*F02C 7/06*    (2006.01)

(52) U.S. Cl.
CPC ............ *F02C 7/06* (2013.01); *F05D 2220/32* (2013.01); *F05D 2260/40* (2013.01)

(58) Field of Classification Search
CPC .......... F02C 7/06; F02C 7/12; F05D 2220/32; F05D 2260/40; F05D 2230/51; F05D 2260/98; F04D 25/00; F04D 25/028; F04D 25/16; F04D 25/163; F04D 1/06; F04D 1/10; F01D 25/20; F01D 13/02; F01D 13/00
USPC ................ 415/198.1, 199.1–199.3; 188/6.11
See application file for complete search history.

(56) References Cited

U.S. PATENT DOCUMENTS

| | | | |
|---|---|---|---|
| 2,234,777 A * | 3/1941 | Puffer | F16N 13/22 417/409 |
| 3,045,778 A | 7/1962 | Mosbacher | |
| 4,025,225 A * | 5/1977 | Durant | F04D 1/06 415/199.1 |
| 4,153,141 A | 5/1979 | Methlie | |
| 4,525,995 A * | 7/1985 | Clark | F01D 25/18 184/6.12 |
| 5,390,635 A | 2/1995 | Kidera et al. | |
| 5,829,401 A | 11/1998 | Masuda | |
| 6,350,110 B1 | 2/2002 | Martin | |
| 7,506,724 B2 | 3/2009 | Delaloye | |
| 8,113,317 B2 | 2/2012 | Delaloye | |
| 8,807,169 B2 | 8/2014 | Amirouche et al. | |
| 9,874,145 B2 | 1/2018 | Teicholz et al. | |
| 2005/0166570 A1* | 8/2005 | Granitz | F16N 7/40 60/39.08 |
| 2009/0299535 A1 | 12/2009 | Delaloye | |
| 2016/0319745 A1 | 11/2016 | Zeller | |
| 2016/0341124 A1* | 11/2016 | Ross | F16K 11/074 |
| 2018/0283281 A1* | 10/2018 | Veilleux, Jr. | F02C 7/36 |

* cited by examiner

*Primary Examiner* — Steven M Sutherland
(74) *Attorney, Agent, or Firm* — Barnes & Thornburg LLP (57) ABSTRACT

A gas turbine engine includes a fan and an engine core configured to provide rotational power during operation of the gas turbine engine. The engine core includes a compressor, a combustor, and a turbine. An oil sump is located in the engine core and is configured to collect oil from the engine core. The gas turbine engine further includes a gearbox configured to be driven by the engine core during operation of the gas turbine engine and an oil pump assembly configured to move the oil from the oil sump to an oil tank and/or to the engine core.

16 Claims, 5 Drawing Sheets

GAS TURBINE ENGINE WITH SCALABLE PUMPING SYSTEM

FIELD OF THE DISCLOSURE

The present disclosure relates to gas turbine engines, particularly to auxiliary systems for use with gas turbine engines. More particularly, the present disclosure relates to pump assemblies for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Some gas turbine engines use lubricant in areas with rotating components to cool the components and reduce friction produced during the operation of the gas turbine engine. The lubricant may collect in one or more sumps and can be recirculated back to the areas of the gas turbine engine using oil pumps. Typical gas turbine engines include a bespoke oil pump assembly that consolidates all of the pumping elements used to deliver lubricant to the areas of the gas turbine engine into a single unit. These bespoke pump assemblies may be specific to the gas turbine engine that they were designed for. A bespoke pump assembly specific to one gas turbine engine may increase the cost and the time to design the gas turbine engine.

SUMMARY

The present disclosure may comprise one or more of the following features and combinations thereof.

According to one aspect of the present disclosure, a gas turbine engine includes a power unit that, a gearbox, and a scalable pump assembly. The power unit includes an engine core configured to provide rotational power during operation of the gas turbine engine, a first oil sump located in the engine core and configured to collect oil from a first area of the engine core, and a second oil sump located in the engine core and configured to collect oil from a second area of the engine core, the engine core including a compressor, a combustor, and a turbine. The gearbox is configured to be driven by the engine core during operation of the gas turbine engine. The scalable oil pump assembly configured to move the oil from the first oil sump and the second oil sump and includes an adapter plate coupled with the gearbox, a first modular pump fluidly connected with the first oil sump, and a second modular pump fluidly connected with the second oil sump.

In some embodiments, the first modular pump is removably coupled with the adapter plate at a first drive connection and driven by the adapter plate during operation of the gas turbine engine and the second modular pump is removably coupled with the first modular pump at a second drive connection and driven by the first modular pump during operation of the gas turbine engine such that the adapter plate is configured to continue to drive the first modular pump in response to a failure event at the second drive connection.

In some embodiments, the scalable oil pump assembly further includes a third modular pump removably coupled with the second modular pump, the second modular pump includes an inlet and an outlet, the third modular pump includes an inlet and an outlet, and the outlet of the second modular pump is in direct fluid communication with the inlet of the third modular pump. The second modular pump and the third modular pump are arranged on a rotational axis that extends through the adapter plate and the outlet of the second modular pump and the inlet of the third modular pump open in an axial direction.

In some embodiments, the scalable oil pump assembly includes a plurality of modular pumps that includes the first modular pump and the second modular pump and the scalable oil pump assembly further includes an oil filter removably coupled with one of the plurality of modular pumps. The scalable oil pump assembly includes a plurality of modular pumps that includes the first modular pump and the second modular pump and the scalable oil pump assembly further includes a fuel pump removably coupled with one of the plurality of modular pumps. The second modular pump is removably coupled directly with the first modular pump.

In some embodiments, the first modular pump is one of a vane, gerotor, lobe, gear, and centrifugal type pump, the second modular pump is one of a vane, gerotor, lobe, gear, and centrifugal type pump, and the second modular pump type is different than the first modular pump type. The first modular pump includes a housing and a pumping element located in the housing, the second modular pump includes a housing and a pumping element located in the housing, and the housing of the second modular pump comprises materials different than the housing of the first modular pump such that the second modular pump is adapted for higher temperature oil than the first modular pump.

According to another aspect of the present disclosure, a gas turbine engine includes an engine core and a scalable pump assembly. The engine core includes a compressor, a combustor, and a turbine and an oil sump located in the engine core. The scalable oil pump assembly is configured to move oil from the oil sump and includes an adapter plate that defines a first axis of rotation and a second axis of rotation that is spaced apart radially from the first axis of rotation, a first modular pump removably coupled with the adapter plate along the first axis of rotation and driven by the adapter plate during operation of the gas turbine engine, and a second modular pump removably coupled with the adapter plate along the second axis of rotation and driven by the adapter plate during operation of the gas turbine engine.

In some embodiments, the scalable oil pump assembly further includes a third modular pump removably coupled with the first modular pump along the first axis of rotation. The first modular pump is coupled with the adapter plate at a first connection and configured to be driven by the adapter plate, the third modular pump is coupled with the first modular pump at a second connection and configured to be driven by the first modular pump such that the first pump remains operational in response to a failure at the second connection.

According to another aspect of the present disclosure, a method includes: providing a first engine core of a first gas turbine engine, a first adapter plate, and a plurality of modular pumps that comprises first type pumps and second type pumps; removably coupling a first combination of first type pumps and second type pumps with the first adapter plate to provide a first pump assembly; and coupling the first pump assembly with the first engine core.

In some embodiments, the method further includes providing a second engine core of a second gas turbine engine and a second adapter plate, removably coupling a second combination of first type pumps and second type pumps with the second adapter plate to provide a second pump assembly, and coupling the second pump assembly with the second engine core and wherein the second combination is different than the first combination.

In some embodiments the method further includes certifying the plurality of first type pumps with the Federal Aviation Administration, certifying the plurality of second type pumps with the Federal Aviation Administration, certifying the first pump assembly with the Federal Aviation Administration, and certifying the second pump assembly with the Federal Aviation Administration. Certifying the first pump assembly includes providing test data of the first pump assembly and certifying the second pump assembly includes relating the test data of the first pump to the second pump assembly without providing test data of the second pump assembly.

In some embodiments, the first pump assembly includes a first modular pump and a second modular pump removably coupled with the first modular pump along an axis, the first modular pump and the second modular pump are included in the plurality of modular pumps, and the method further includes driving the first modular pump with the adapter plate without driving the second modular pump. The first pump assembly includes a first modular pump removably coupled with the adapter plate along a first axis and a second modular pump removably coupled with the adapter plate along a second axis that is spaced apart radially from the first axis and the first modular pump and the second modular pump are included in the plurality of modular pumps.

These and other features of the present disclosure will become more apparent from the following description of the illustrative embodiments.

BRIEF DESCRIPTION OF THE DRAWINGS

The detailed description particularly refers to the accompanying figures in which:

FIGS. 5A-5E are a series of side elevation views of various types and assemblies of modular pumps in accordance with the present disclosure suggesting different ways that the modular pumps may be removably coupled with one another;

DETAILED DESCRIPTION

For the purposes of promoting an understanding of the principles of the disclosure, reference will now be made to a number of illustrative embodiments illustrated in the drawings and specific language will be used to describe the same.

Figure 1:
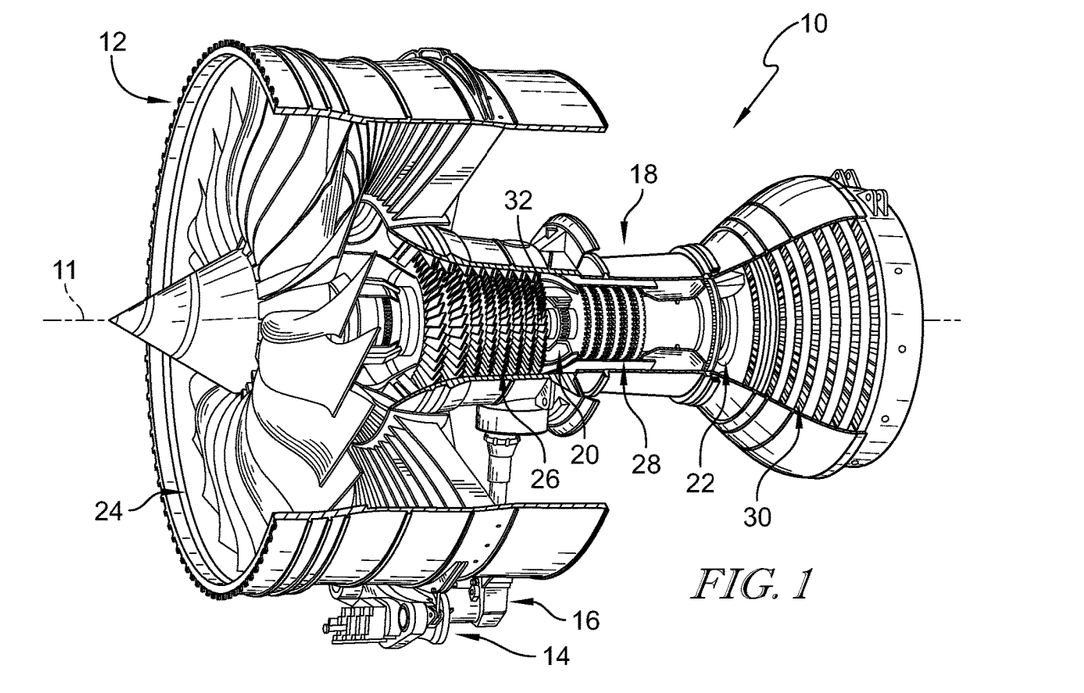
FIG. 1 is a perspective view of a gas turbine engine in accordance with the present disclosure, the gas turbine engine includes a power unit having an engine core and oil sumps located in the engine core, a gearbox, and a scalable pump assembly located beneath the engine core and configured to scavenge oil from the oil sumps and move the scavenged oil to the engine core.
Figure 2:
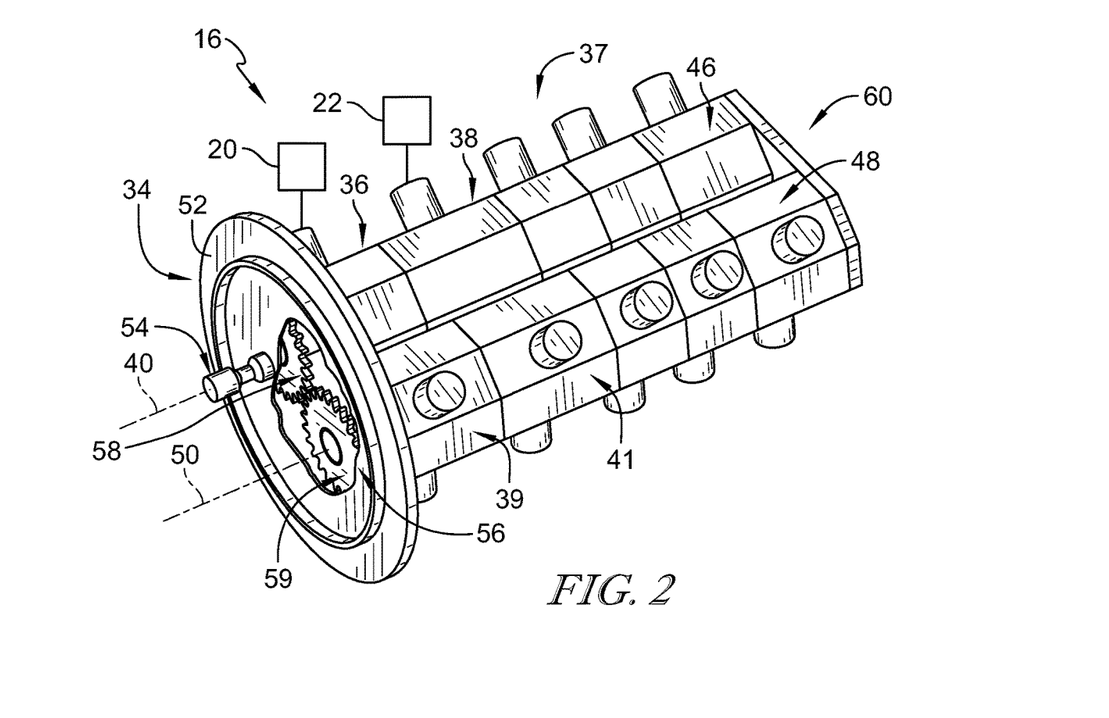
FIG. 2 is a perspective view of the scalable pump assembly included in the gas turbine engine of FIG. 1 showing that the scalable pump assembly includes an adaptor plate for coupling with the gearbox and a plurality of modular pumps removably coupled to one another and to the adaptor plate to allow for customizable numbers and arrangements of the modular pumps, and further showing that the adapter plate includes gearing to drive multiple stacks of pumps.

An illustrative gas turbine engine 10 includes a power unit 12, a gearbox 14, and a scalable pump assembly 16 as shown in FIGS. 1 and 2. The power unit 12 includes an engine core 18, a first oil sump 20 located in the engine core 18 and configured to collect oil from a first area of the engine core 18, and a second oil sump 22 located in the engine core 18 and configured to collect oil from a second area of the engine core 18. The gearbox 14 is coupled to the engine core 18 and is configured to be driven by the engine core 18 during operation of the gas turbine engine 10. The scalable pump assembly 16 is driven by the gearbox 14 and is configured to move the oil from the first oil sump 20 and the second oil sump 22. The scavenged oil from the first and second oil sumps 20, 22 may be routed to an oil tank and then pumped to the engine core 18 using the scalable pump assembly 16. The scalable pump assembly 16 is modular and reconfigurable to meet oil flow needs for a wide variety of gas turbine engines such as gas turbine engine 10.

The engine core 18 includes a fan 24, a compressor 26, a combustor 28, and a turbine 30 as shown in FIG. 1. The fan 24 is driven by the turbine 30 and provides thrust for propelling an air vehicle, for example. The compressor 26 compresses and delivers pressurized air to the combustor 28. The combustor 28 mixes fuel with the compressed air received from the compressor 26 and ignites the fuel. The hot, high-pressure products of the combustion reaction in the combustor 28 are directed into the turbine 30 to cause the turbine 30 to rotate about a central reference axis 11 and drive the compressor 26 and the fan 24. In other embodiments, the fan 24 is omitted and the engine core 18 includes a propeller or a drive shaft for rotating a thrust device or for providing rotational energy in an industrial setting.

Each of the fan 24, compressor 26, the combustor 28, and the turbine 30 are connected to each other via one or more shafts 32 that also rotate about the central reference axis 11 during operation of the gas turbine engine 10. Illustratively, the gearbox 14 is coupled to the shaft 32 and is configured to transfer rotational forces from the shaft 32 to the scalable pump assembly 16 to drive the scalable pump assembly 16 during operation of the gas turbine engine 10.

The scalable pump assembly 16 includes an adapter plate 34 coupled with the gearbox 14, a first modular pump 36 fluidly connected with the first oil sump 20, and a second modular pump 38 fluidly connected with the second oil sump 22 as suggested in FIG. 2. The first modular pump 36 and the second modular pump 38 are coupled together and arranged along a first longitudinal axis 40. The first modular pump 36 is removably coupled with the adapter plate 34 and is driven by the adapter plate 34 during operation of the gas turbine engine 10. The second modular pump 38 is removably coupled with the first modular pump 36 and is driven by the first modular pump 36 during operation of the gas turbine engine 10. Either the first modular pump 36 or the second modular pump 38 may be removed from the pump assembly 16 without redesigning the pump assembly 16 if the first modular pump 36 or the second modular pump 38 is not needed in the gas turbine engine 10. In other embodiments, the first and second modular pumps 36, 38 are driven by the adapter plate 34 via a single shaft.

Figure 3:
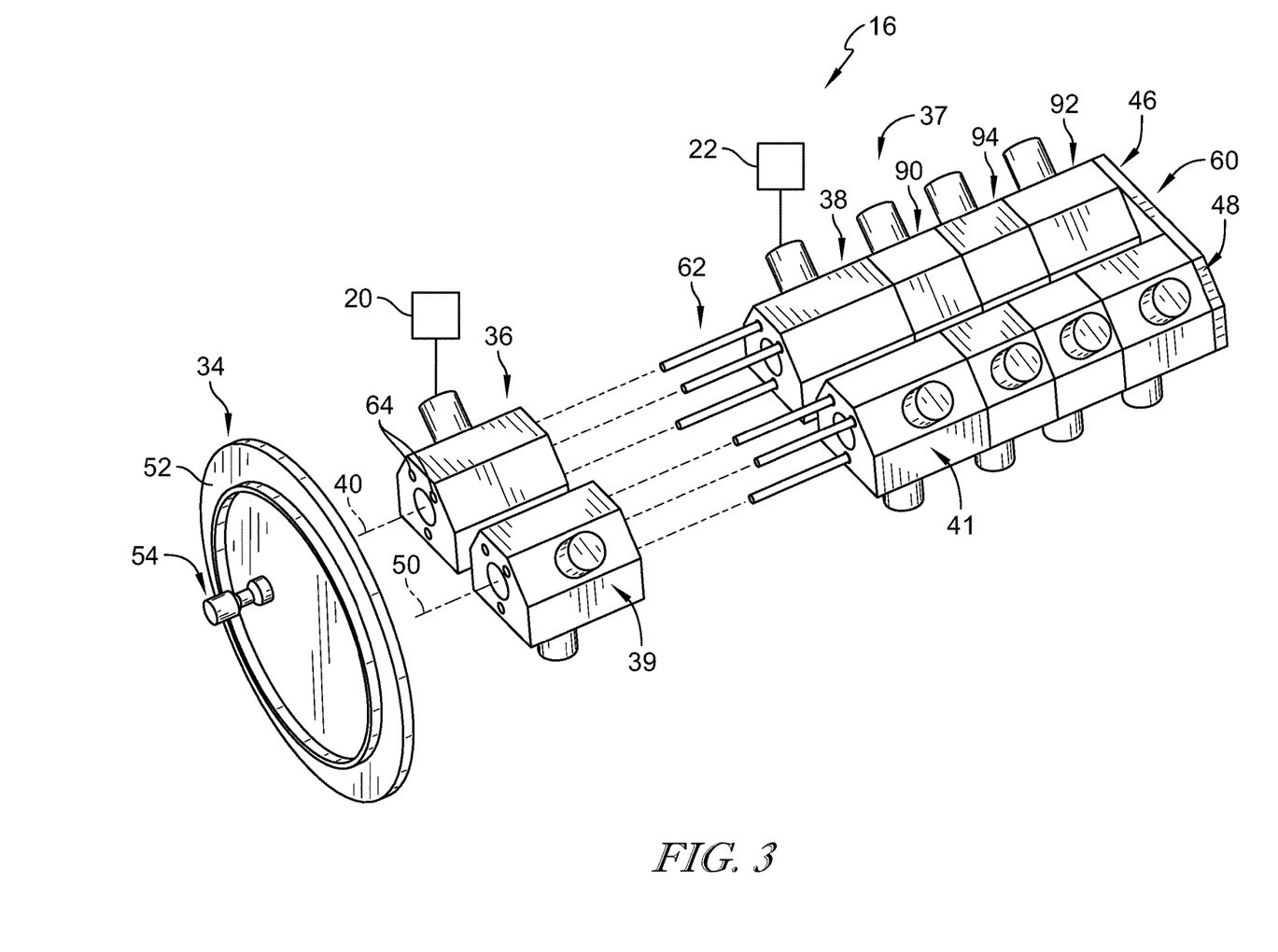
FIG. 3 is a perspective and partial exploded view of the scalable pump suggesting that each individual pump may be removed from the scalable pump assembly or additional pumps added so that the scalable pump assembly is adaptable to work with a wide variety of gas turbine engines.

The pump assembly 16 illustratively includes a plurality of modular pumps 37 that are each independently removable from the pump assembly 16 to reconfigure the pump assembly 16 to meet oil flow needs of the gas turbine engine 10 as suggested in FIG. 3. Typical gas turbine engines may be designed with a bespoke pump assembly that is specific to that gas turbine engine only. In the illustrative embodiment, any of the modular pumps 37 may be removed from the pump assembly 16 and replaced with another modular pump 37 or omitted from the pump assembly 16 at any time. Additional pumps 37 may be added to the pump assembly 16 as needed such as during the design and development of a gas turbine engine. By allowing the addition or removal of individual pumps 37 from the pump assembly 16, the pump assembly 16 may be customized or scalable for use with multiple gas turbine engines without the use of a bespoke pump assembly that cannot be reconfigured for separate engines. In this way, the pump assembly 16 is scalable for use with a wide variety of gas turbine engines.

Each pump 37 may be designed to operate at different operating parameters specific to the area of the gas turbine engine they serve. For example, the first modular pump 36 may be configured to operate with a first set of operating parameters while the second modular pump 38 may be configured to operate with a second set of operating parameters that are different than the first set of operating parameters. A few non-limiting examples of operating parameters that the pumps 37 may include are, for example, flow rate, pressure, velocity, and/or head.

In the illustrative embodiment, the pump assembly 16 includes a first stack 46 of modular pumps 37 and a second stack 48 of modular pumps 37 located adjacent to the first stack 46 as shown in FIGS. 2 and 3. The second stack 48 is arranged adjacent to the first stack 46 along a second longitudinal axis 50 that is generally parallel with the first longitudinal axis 40. The second stack 48 includes a third modular pump 39 and a fourth modular pump 41 different than the third modular pump 39. The third and fourth pumps 39, 41 may have operating parameters that are similar or different from the first and second modular pumps 36, 38. Additional stacks of modular pumps 37 may be provided adjacent to either the first stack 46 or the second stack 48.

Each stack of modular pumps illustratively includes five individual modular pumps 37 as shown in FIGS. 2 and 3. However, any number of modular pumps 37 may be included in either the first stack 46 or the second stack 48. In other embodiments, the number of modular pumps 37 may vary between the first stack 46 and the second stack 48 such that the first stack 46 of modular pumps 37 includes a first number of individual pumps 37 while the second stack 48 of modular pumps 37 includes a second number of individual pumps different than the first number.

In the illustrative embodiment, the adaptor plate 34 is configured to transfer rotation from the gearbox 14 to each of the pumps 37. The adaptor plate 34 includes a main body 52, a primary drive shaft 54 coupled to the main body 52, and a drive gear assembly 56 as shown in FIG. 2. The main body 52 includes a plate having a generally circular shape. The primary drive shaft 54 extends away from the main body 52 of the adaptor plate 34 and the modular pumps 37. The primary drive shaft 54 is configured to couple to the gearbox 14 to transfer rotational forces from the gearbox 14 to the primary drive shaft 54. In the illustrative embodiment, the primary drive shaft 54 is aligned with the first longitudinal axis 40 of the first stack 46 such that the primary drive shaft 54 is rotated about the first longitudinal axis 40. The drive gear assembly 56 is configured to drive simultaneously each stack of modular pumps 37 through the primary drive shaft 54.

The drive gear assembly 56 is optional and may be included when the pump assembly 16 includes more than one stack of modular pumps 37. The drive gear assembly 56 includes a first gear 58 coupled to the primary drive shaft 54 and a second gear 59 offset from and interlocked with the first gear 58 as shown in FIG. 2. The first gear 58 is rotated with the primary drive shaft 54 and transfers rotational forces to the second gear 59. The second gear 59 is configured to rotate about the second longitudinal axis 50 to drive the second stack 48 of pumps 37. Illustratively, the gears 58, 59 rotate at the same speed. In other embodiments, gears 58, 59 have any desired gear ratio.

The pump assembly 16 may further include a support plate 60 and a plurality of attachment rods 62 as shown in FIG. 3. The support plate 60 is spaced apart axially from the adaptor plate 34. The attachment rods 62 extend axially between the adaptor plate 34 to the support plate 60. Each of the pumps 37 are formed to include axial slots 64 that correspond to the attachment rods 62. The pumps 37 are combined to form the pump assembly 16 by sliding each of the pumps 37 onto the attachment rods 62 such that each of the rods 62 are received in corresponding slots 64 formed in the pumps 37. The pumps 37 slide onto the attachment rods 62 consecutively until they reach the support plate 60 or another pump 37. In the illustrative embodiment, the adaptor plate 34, the support plate 60 and the attachment rods 62 retain the pumps 37 together and form the pump assembly 16. Alternatively, each of the pumps 37 may be retained together by another suitable structure, such as, for example plates or ribs that extend between each of the pumps 37 or an outer casing that holds all of the pumps 37 together. In yet another embodiment, the pumps 37 may be combined and held together by internal structures such as a drive shaft 70 included in each of the pumps 37.

Figure 4:
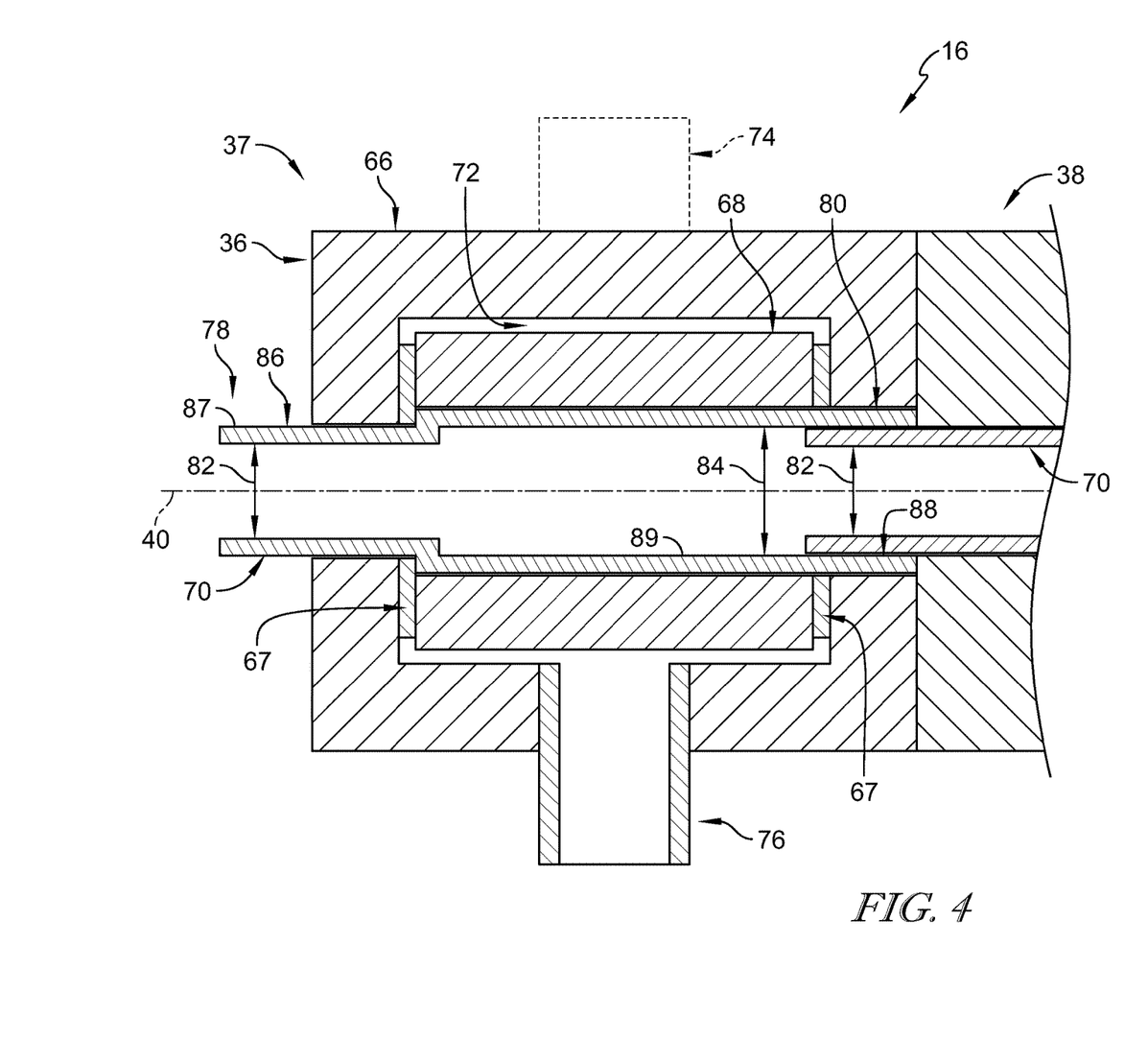
FIG. 4 is a diagrammatic and sectional view of one of the modular pumps for use with the scalable pump assembly of FIG. 2 showing that the modular pump includes a drive shaft configured to rotate about a longitudinal axis and a pumping element located within a housing of the modular pump and suggesting that the drive shaft is sized to interlock with another drive shaft of a neighboring modular pump.

In the illustrative embodiment, each of the pumps 37 are separate and substantially sealed from one another and receive a scavenge oil flow from one area of the engine core 18. Each pump 37 includes a housing 66, a pumping element 68, and a drive shaft 70 as shown in FIG. 4. The housing 66 defines an internal chamber 72 and includes an inlet port 74 and an outlet port 76. The oil is scavenged from a sump and enters the pump 37 through the inlet port 74 and into the internal chamber 72. The pumping element 68 is located in the internal chamber 72 and is configured to pressurize the scavenged oil in the chamber 72 so that it is sent out of the chamber 72 thorough the outlet port 76. The drive shaft 70 extends axially through the internal chamber 72 and is coupled to the pumping element 68 to drive the pumping element 68 as it pressurizes the oil. The pumping element 68 may include any suitable type of displacement pump such as a vane, gerotor, lobe, gear, or a centrifugal type pump.

Each pump 37 may further include seal members 67 located between portions of the housing 66 and the drive shaft 70 so that each pump 37 is sealed from one another. The seal member 67 may include any suitable seal such as, for example, an o-ring seal, lip seal, wire or braid seals, and mechanical seals. In another embodiment, two or more pumps 37 may be fluidly connected in series as shown in FIG. 5E and described in greater detail below.

The drive shaft 70 of each of the pumps 37 has a first drive connection 78 and a second drive connection 80 spaced axially from the first drive connection 78 as shown in FIG. 4. The first and second drive connections are configured to couple to either the adaptor plate 34 or an adjacent pump 37. For example, the first pump 36 is coupled to the primary drive shaft 54 of the adaptor plate 34 at the first drive connection 78 and is coupled to the second pump 38 at the second drive connection 80 as suggested in FIG. 4. Each time a pump 37 is added to a stack of the pump assembly 16, the opposing drive connections 78, 80 of adjacent pumps 37 interlock such that the drive shaft 70 of the first pump 36 rotates the drive shaft 70 of the second pump 38.

In the illustrative embodiment, the first and second drive connections 78, 80 are splined and are sized to interlock with the drive shaft 70 of an axially adjacent pump 37 as suggested in FIG. 4. The first drive connection 78 has a first diameter 82 while the second drive connection 80 has a second diameter 84 that is slightly larger than the first diameter 82. The first drive connection 78 includes splines 86 on a radially outer surface 87 of the drive shaft 70.

The second drive connection 80 includes corresponding splines 88 on a radially inner surface 89 of the drive shaft 70. When the first pump 36 is combined with the first stack 46, the second drive connection 80 receives the first drive connection 78 due to the difference in diameters 82, 84. The corresponding splines 88 on the radially inner surface 89 of the first pump 36 interlock with splines 86 on the radially outer surface 87 of the drive shaft 70 of the second pump 38 to transfer torque between the first and second pumps 36, 38. Additionally, the primary drive shaft 54 of the adaptor plate 34 is splined and is configured to mesh with the first drive connection of the pump 37 nearest the adaptor plate to transfer torque to each of the pumps 37.

In the event of a failure of one of the pumps 37, the other pumps may be able to continue operations. For example, the first pump 36 is configured to remain functional in response to a failure at the second drive connection 80. In another example, the second pump 38 is configured to remain functional in response to a failure of the pumping element 68 of the first pump 36. As one example, the drive shafts 70, 80 or splines are keyed or formed with another suitable feature adapted to fail first and allow the pumps located before the failure to continue to operate.

In other embodiments, a single shaft extends through and drives each of the pumps 37 of a given stack 46, 48. In such embodiments, failure of the shaft may cause all pumps 37 in the failed stack to become inoperable.

In the illustrative embodiment, the other devices may also be used with the pump assembly 16. For example, the pump assembly 16 may also include a fuel pump 90, a filter 92, an aerator 94, and/or any other rotatable device that is used in a gas turbine engine as shown in FIG. 3. The other devices are also removably coupled to the pump assembly 16 and are stackable similarly to the first and second modular pumps 36, 38.

Figure 5A:
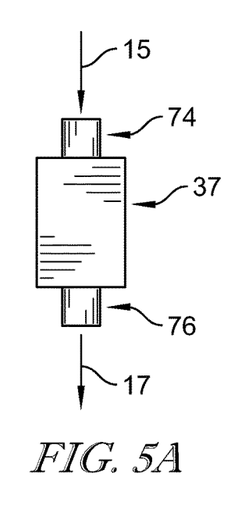
FIG. 5A is a side elevation view of a first embodiment of a modular pump adapted for use with the scalable pump assembly of FIG. 2 and including a housing with a scavenge inlet port configured to receive oil from a single sump and an outlet port that is configured to distribute oil to an oil tank or section of the engine core.
Figure 5B:
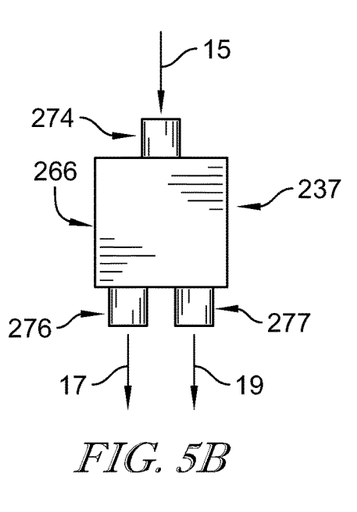
FIG. 5B is a side elevation view of a second embodiment of a modular pump adapted for use with the scalable pump assembly of FIG. 2 and including a housing with a scavenge inlet port configured to receive oil from a single sump and first and second outlet ports.

The modular pumps 37 may be designed to service a single area of the engine core 18, as shown in FIG. 5A, or multiple areas of the engine core 18, as shown in FIG. 5B. The modular pump 37 shown in FIG. 5A includes a single inlet port 74 and a single outlet port 76. The modular pump 37 is configured to receive scavenged oil 15 from a single sump location and provide pressurized oil 17 through the outlet port 76.

A second embodiment of a modular pump 237 is shown in FIG. 5B. The modular pump 237 is similar to modular pump 37 and similar reference numbers are used to describe similar features between modular pump 237 and modular pump 37. Accordingly, the disclosure related to modular pump 37 is hereby incorporated by reference for modular pump 237 except for the differences described below.

The modular pump 237 includes a housing 266 having a single inlet port 274 and first and second outlet ports 276 and 277 as shown in FIG. 5B. The single inlet port 274 is configured to receive scavenged oil 15 from a single sump location. The modular pump 237 is configured to deliver a first pressurized oil flow 17 to a first area of the engine and a second pressurized oil flow 19 to a second area of the engine 10 such as one of the sumps 20, 22 and/or an oil tank. As such, the modular pump 237 is configured to service multiple areas of the engine 10. Although only two outlet ports 276, 277 are shown in FIG. 5B, any suitable number of outlet ports may be included in modular pump 237.

Figure 5C:
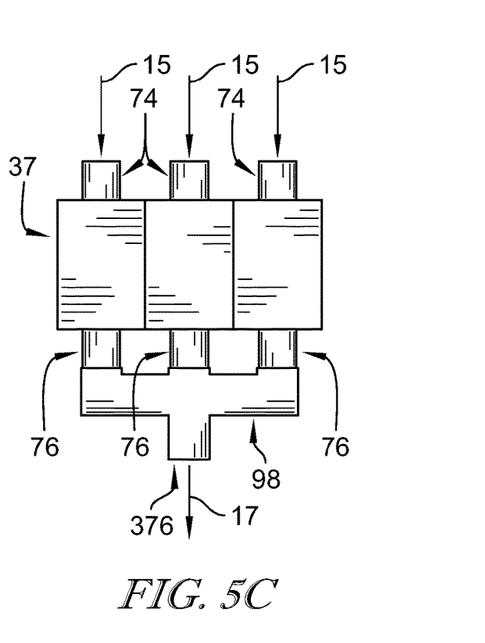
FIG. 5C is a side elevation view of a plurality of the modular pumps from FIG. 5A neighboring one another and a manifold conduit configured to receive each of the oil flows from the outlet ports and combine each of the oil flows into a single outlet for distribution to the engine core.
Figures 5D, 5E:
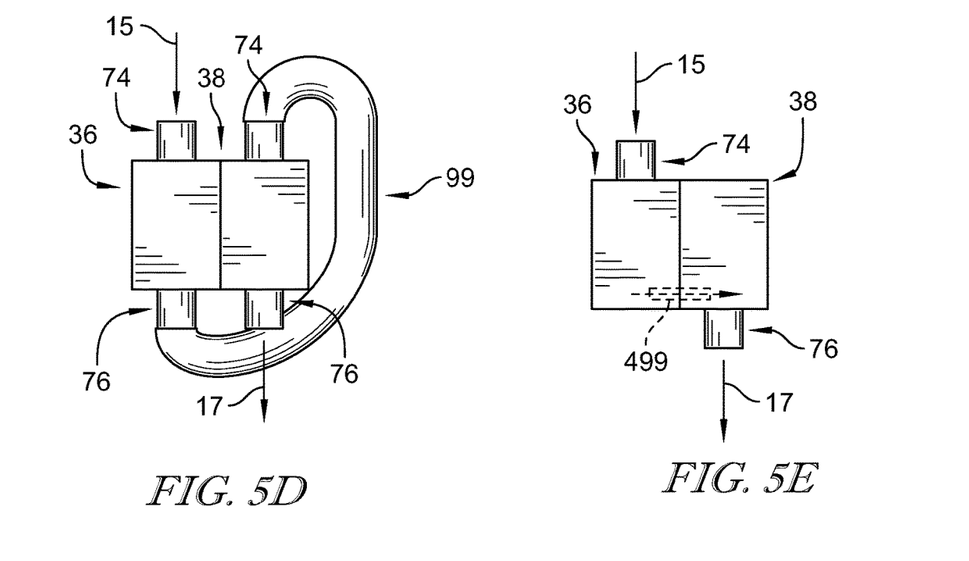
FIG. 5D is a side elevation view of a plurality of the modular pumps from FIG. 5A neighboring one another and a conduit extending from the outlet port of a first modular pump to the inlet of a second modular pump to boost the oil flow received in the scavenge inlet port of the first modular pump before distributing the oil flow to the oil tank or the engine core through the outlet port of the second modular pump.
FIG. 5E is a side elevation view of a first modular pump and a second modular pump that cooperate to define an internal conduit between one another when combined and suggesting that the oil flow is transferred from the first modular pump to the second modular pump to boost the oil flow before distributing the oil flow to the oil tank or the engine core through an outlet port of the second modular pump.

In the illustrative embodiment, multiple module pumps 37 may be used together to increase an amount of oil provided to an area of the engine core 18 or increase the flow rate or pressure of the oil provided to an area of the engine core 18 as suggested in FIGS. 5C-5E. A plurality of the modular pumps 37 neighboring one another may include a manifold conduit 98 as shown in FIG. 5C. The manifold conduit 98 is configured to receive each of the oil flows from the outlet ports 76 of the pumps 37 and combine each of the oil flows into a single outlet 376 for distribution to the engine core 18.

A plurality of the modular pumps 37 may also be combined in series as shown in FIGS. 5D and 5E. For example, the outlet port 76 of the first modular pump 36 may be connected to the inlet port 74 of the neighboring pump 38 by a conduit 99. The scavenged oil flow 15 enters the inlet port 74 of the first pump 36, is pressurized and delivered to the inlet port 74 of the second pump 38 through the conduit 99, and is boosted by the second pump 38 before distributing the oil flow 17 to the oil tank or the engine core 18 through the outlet port 76 of the second modular pump.

In another embodiment, the first pump 36 and the second pump 38 may be formed to include an internal conduit 499 between one another when combined as suggested in FIG. 5E. The inlet port 74 of the first pump 36 receives the scavenged oil flow 15. The oil flow is then transferred from the first modular pump 36 to the second modular pump 38 through the internal conduit 499 to boost the oil flow before distributing a pressurized oil flow 17 to the oil tank or the engine core 18 through the outlet port 76 of the second modular pump 38.

Figure 6:
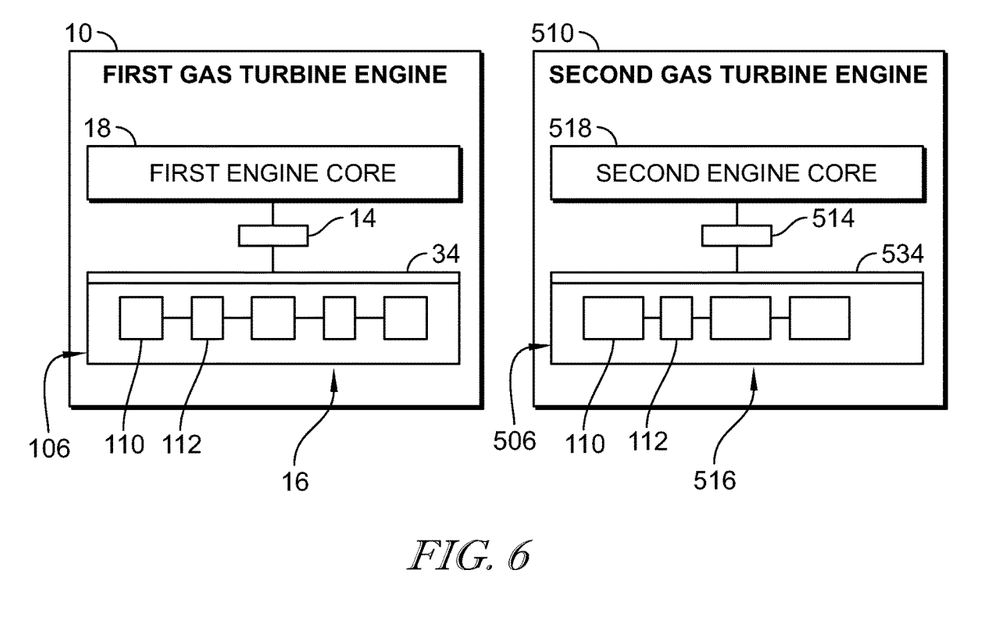
FIG. 6 is a diagrammatic view of a first gas turbine engine with a scalable pump assembly having a first combination of modular pumps and a second gas turbine engine with a scalable pump assembly having a second combination of modular pumps different than the first combination of modular pumps.

According to another aspect of the present disclosure, a method includes providing a first engine core 18 of a first gas turbine engine 10, a first adapter plate 34, and a plurality of modular pumps 37 that includes first type pumps 110 and second type pumps 112 as shown in FIG. 6. The method further includes removably coupling a first combination 106 of first type pumps 110 and second type pumps 112 with the first adapter plate 34 to provide a first pump assembly 16. The first pump assembly 16 is coupled with the first engine core 18 via the gearbox 14.

The method further includes providing a second engine core 518 of a second gas turbine engine 510 and a second adapter plate 534 as shown in FIG. 6. A second combination 506 of first type pumps 110 and second type pumps 112 are removably coupled with the second adapter plate 534 to provide a second pump assembly 516. The second pump assembly 516 is coupled with the second engine core 518 via a second gearbox 514 and is different than the first pump assembly 16. The second combination 506 being different than the first combination 106. Although only first and second type pumps 110, 112 are shown in FIG. 6, any number of different types of pumps may be used. This method illustrates how the various pumps are scalable and modular to provide a pump assembly for different gas turbine engines.

The use of separate first type pumps 110 and second type pumps 112 may also allow for expedited certification of the gas turbine engines 10, 510. For example, each of the pump types 110, 112 may be certified individually. The method may further include certifying the plurality of first type pumps 110 with the Federal Aviation Administration, certifying the plurality of second type pumps 112 with the Federal Aviation Administration, certifying the first pump assembly 16 with the Federal Aviation Administration, and certifying the second pump assembly 516 with the Federal Aviation Administration. In one embodiment the method may include providing test data of the first pump assembly 16 and/or each pump type 110, 112, etc. The test data may be related to the second pump assembly 516 without providing test data of the second pump assembly 516 for example, because the second pump assembly uses the certified pump types 110, 112 and/or is similar to the pump assembly 16. As such, the second pump assembly 516 may be certified quickly based on similarities between the various types of pumps 110, 112 included in each pump assembly 16, 516.

In illustrative embodiments, jet engine designs may have unique and different oil system needs. These variable oil system needs may make it difficult to reuse a single lube/scavenge pump for multiple applications/different models of engines. Similar applications may still have slightly different lubrication needs or operating envelopes that will mean a single pump cannot be used across multiple platforms/models of engines. The cost of designing a new bespoke pump for every engine program, and potentially multiple pumps for a single engine program as it matures, is may be significant. The uniqueness of each pump may have to do with the interface locations and the number of pumping elements each lubrication system requires. The present disclosure may provide a cost effective solution for new products and designs by designing and certifying individual scalable and stackable pumping elements that can be assembled into a single functional LRU (line replaceable unit). Each pump element may be individually certified and tested.

In illustrative embodiments, each individual micro pump may belong to a family of pumps allowing for individual micro pumps to be common across multiple engine programs while the entire pump assembly is unique for each engine application. This may allow for cheaper pumps by improving their economy of scale. Also, each individual micro pump may be certified and read across to multiple applications.

In illustrative embodiments, an adapter plate 34 and support plate 60 can be used to attach multiple stacks 46, 48 together to create something that would be functionally equivalent to a bespoke pump assembly. Each micro pump stack could be driven by a single shaft that goes for the length of the pump or by individual connections (spine, pin, other) between the micro pumps. Individual connections could allow for unique fault isolation situations that would add flexibility to the system design. For example, if pump 36 and pump 38 are both lube supply elements, the pump assembly 16 could be designed such that a pump 38 failure does not cause pump 36 to stop functioning.

In illustrative embodiments, each micro pump could be in a different orientation/clocking position than its neighbor; for example pump 38 could be rotated 45 degrees from pump 36. The support plate 60 could be moved between pumps thus allowing other pumps to be deleted if not required. Multiple support plates 60 could be added to meet a desired assembly strength.

In illustrative embodiments, aluminum is often used as a housing material in pumps, for example, but the housing material could be different depending on the operating conditions of each of the pumps. For example, pump 36 may include an aluminum housing while pump 38 may include a steel housing in order to deal with higher scavenge oil temperatures. The flexibility of the pump assembly 16 allows a pump with an aluminum housing to be replaced with a pump with a steel housing as an engine development program shows that a scavenge element is delivering higher than expected scavenge oil temperatures. Adapter plates 34 can be bespoke to the engine program while allowing the various micro pumps to be part of a product line. If for some reason a three stack pump is desired, an adapter plate can be used that allows that. Each micro pump may use a different pumping element as appropriate (e.g. vane, gerotor, lobe, gear, centrifugal, etc.). Each pump could also have a housing allowing axial or radial fluid fittings or ports.

In illustrative embodiments, the engine 10 may include a sub assembly of micro pumps that have multiple inlets and a single outlet. The pump assembly 16 may include a fuel pump 90, a permanent magnet alternator (PMA), breather, or any rotating accessory. The pump assembly may include various valve and filter segments designed to be assembled with or between the micro pumps or micro pump stacks.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
a power unit that includes an engine core configured to provide rotational power during operation of the gas turbine engine, a first oil sump located in the engine core and configured to collect oil from a first area of the engine core, and a second oil sump located in the engine core and configured to collect oil from a second area of the engine core, the engine core including a compressor, a combustor, and a turbine, and
a gearbox configured to be driven by the engine core during operation of the gas turbine engine, and
a scalable oil pump assembly configured to move the oil from the first oil sump and the second oil sump, the scalable oil pump assembly including an adapter plate coupled with the gearbox, a first modular pump fluidly connected with the first oil sump, and a second modular pump fluidly connected with the second oil sump,
wherein the first modular pump is removably coupled with the adapter plate at a first drive connection and driven by the adapter plate during operation of the gas turbine engine and the second modular pump is removably coupled with the first modular pump at a second drive connection and driven by the first modular pump during operation of the gas turbine engine such that the adapter plate is configured to continue to drive the first modular pump in response to a failure event at the second drive connection.

2. The gas turbine engine of claim 1, wherein the scalable oil pump assembly further includes a third modular pump removably coupled with the second modular pump, the second modular pump includes an inlet and an outlet, the third modular pump includes an inlet and an outlet, and the outlet of the second modular pump is in direct fluid communication with the inlet of the third modular pump.

3. The gas turbine engine of claim 2, wherein the second modular pump and the third modular pump are arranged on a rotational axis that extends through the adapter plate and the outlet of the second modular pump and the inlet of the third modular pump open in an axial direction.

4. The gas turbine engine of claim 1, wherein the scalable oil pump assembly includes a plurality of modular pumps that includes the first modular pump and the second modular pump and the scalable oil pump assembly further includes an oil filter removably coupled with one of the plurality of modular pumps.

5. The gas turbine engine of claim 1, wherein the scalable oil pump assembly includes a plurality of modular pumps that includes the first modular pump and the second modular pump and the scalable oil pump assembly further includes a fuel pump removably coupled with one of the plurality of modular pumps.

6. The gas turbine engine of claim 1, wherein the second modular pump is removably coupled directly with the first modular pump.

7. The gas turbine engine of claim 1, wherein the first modular pump is one of a vane, gerotor, lobe, gear, and centrifugal type pump, the second modular pump is one of a vane, gerotor, lobe, gear, and centrifugal type pump, and the second modular pump type is different than the first modular pump type.

8. The gas turbine engine of claim 1, wherein the first modular pump includes a housing and a pumping element located in the housing, the second modular pump includes a housing and a pumping element located in the housing, and the housing of the second modular pump comprises materials different than the housing of the first modular pump such that the second modular pump is adapted for higher temperature oil than the first modular pump.

9. The gas turbine engine of claim 1, wherein the first modular pump includes a first pumping element and a first drive shaft coupled with the first pumping element, the second modular pump includes a second pumping element and a second drive shaft coupled with the second pumping element, and the second drive shaft is removably coupled with the first drive shaft at the second drive connection.

10. The gas turbine engine of claim 9, wherein the first drive shaft is removably coupled with the adapter plate at the first drive connection.

11. A gas turbine engine comprising
an engine core that includes a compressor, a combustor, and a turbine and an oil sump located in the engine core,
a scalable oil pump assembly configured to move oil from the oil sump, the scalable oil pump includes an adapter plate that defines a first axis of rotation and a second axis of rotation that is spaced apart radially from the first axis of rotation, a first modular pump removably coupled with the adapter plate along the first axis of rotation and driven by the adapter plate during operation of the gas turbine engine, and a second modular pump removably coupled with the adapter plate along the second axis of rotation and driven by the adapter plate during operation of the gas turbine engine,
wherein the scalable oil pump assembly further includes a third modular pump removably coupled with the first modular pump along the first axis of rotation,
wherein the first modular pump is coupled with the adapter plate at a first connection and configured to be driven by the adapter plate, the third modular pump is coupled with the first modular pump at a second connection and configured to be driven by the first modular pump such that the first pump remains operational in response to a failure at the second connection.

12. The gas turbine engine of claim 11, wherein the first modular pump includes an inlet and an outlet, the third modular pump includes an inlet and an outlet, and the outlet of the first modular pump is in direct fluid communication with the inlet of the third modular pump.

13. The gas turbine engine of claim 11, wherein the scalable oil pump assembly includes a plurality of modular pumps that includes the first modular pump, the second modular pump, and the third modular pump and the scalable oil pump assembly further includes an oil filter removably coupled with one of the plurality of modular pumps.

14. The gas turbine engine of claim 11, wherein the first modular pump includes a first pumping element and a first drive shaft coupled with the first pumping element, the third modular pump includes a second pumping element and a second drive shaft coupled with the second pumping element, and the second drive shaft is removably coupled with the first drive shaft at the second connection.

15. The gas turbine engine of claim 14, wherein the first drive shaft is removably coupled with the adapter plate at the first connection.

16. A gas turbine engine comprising
an engine core that includes a compressor, a combustor, and a turbine and an oil sump located in the engine core,
a scalable oil pump assembly configured to move oil from the oil sump, the scalable oil pump includes an adapter plate that defines a first axis of rotation and a second axis of rotation that is spaced apart radially from the first axis of rotation, a first modular pump removably coupled with the adapter plate along the first axis of rotation and driven by the adapter plate during operation of the gas turbine engine, and a second modular pump removably coupled with the adapter plate along the second axis of rotation and driven by the adapter plate during operation of the gas turbine engine,
wherein the scalable oil pump assembly includes a plurality of modular pumps that includes the first modular pump and the second modular pump and the scalable oil pump assembly further includes a fuel pump removably coupled with one of the plurality of modular pumps.

\* \* \* \* \*